(12) United States Patent
Shiozawa et al.

(10) Patent No.: US 7,578,952 B2
(45) Date of Patent: Aug. 25, 2009

(54) METHOD FOR PREVENTING BACKFLOW OF RESIN IN INJECTION APPARATUS

(75) Inventors: Fumio Shiozawa, Nagano-ken (JP);
Hidenobu Yoda, Nagano-ken (JP);
Yoshito Aruga, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 824 days.

(21) Appl. No.: 11/241,861

(22) Filed: Sep. 30, 2005

(65) Prior Publication Data

US 2006/0071370 A1    Apr. 6, 2006

(30) Foreign Application Priority Data

Oct. 1, 2004    (JP)    ............................. 2004-290462

(51) Int. Cl.
*B29C 45/52*    (2006.01)
(52) U.S. Cl. .................... 264/40.5; 264/328.1; 425/145
(58) Field of Classification Search ................ 264/40.1, 264/40.5, 328.1; 425/145
See application file for complete search history.

(56) References Cited

U.S. PATENT DOCUMENTS 5,425,906 A * 6/1995 Hashimoto ................. 264/40.1
6,325,954 B1 * 12/2001 Sasaki et al. ................ 264/40.1
7,291,297 B2 * 11/2007 Weatherall et al. .......... 264/40.1

FOREIGN PATENT DOCUMENTS

| JP | 62-060621 |   | 3/1987 |
|----|-----------|---|--------|
| JP | 04-65212  | * | 3/1992 |
| JP | 2 814 212 |   | 8/1998 |
| JP | 10-337762 | * | 12/1998|

OTHER PUBLICATIONS

Dray, Robert F., "Injection Molding: A Technical Analysis of Check Valves", Jun. 1994, Plastics Engineering, pp. 23-26.*

* cited by examiner

*Primary Examiner*—Jill L Heitbrink
(74) *Attorney, Agent, or Firm*—Weingarten, Schurgin, Gagnebin & Lebovici LLP

(57) ABSTRACT

Leak of a metered resin by backflow in injection filling is prevented not depending on reverse rotation of a screw but by closing a ring valve by controlling a screw forward movement speed in injection filling. An injection filling speed and a valve closing operation speed are set to the screw forward movement speed. The valve closing operation speed is different from an initial speed of the injection filling speed, and the operation time thereof is set to the time necessary for moving the injection screw by a distance capable of performing the valve closing after the end of metering. The valve closing is performed with the set operation speed and the set operation time.

2 Claims, 5 Drawing Sheets

Set Speed : 50 mm/s
Operation Time : 10 ms

Set Speed : 70 mm/s
Operation Time : 10 ms

Set Speed : 0 mm/s
Operation Time : 0 ms

METHOD FOR PREVENTING BACKFLOW OF RESIN IN INJECTION APPARATUS

This application claims priority to a Japanese application No. 2004-290462 filed Oct. 1, 2004.

BACKGROUND OF THE INVENTION

1. Field of the Invention

The present invention relates to prevention of backflow of resin in an injection apparatus including an injection screw with a backflow preventive ring valve at a screw tip portion provided within a heating cylinder and, particularly, a method for preventing backflow of resin effective for low-viscosity resin.

2. Description of the Related Art

In a conventional in-line screw type injection apparatus used for injection molding of resin, comprising an injection screw with a backflow preventive ring valve axially movably fitted to a screw tip portion, the injection screw being provided within a heating cylinder with a nozzle at a tip thereof so as to be rotatable and movable forward and backward, a molten resin plasticized on a feed part side is carried through a flowing gap between the rear end surface of the valve ring and a sheet ring on the circumference of a screw shaft toward the screw tip via the inside of the valve ring by rotation of the screw and metered (accumulated) in a front portion of the heating cylinder, and opening and closing of the ring valve is performed by use of the resin pressure in front and rear of the ring valve.

The opening of the ring valve is attained by the pressure of the molten resin within a screw groove moving in the valve direction from the rear of the feed part with plasticization by normal rotation (left-hand rotation) of the injection screw. The closing thereof is attained by the resin pressure generated by compression of the metered resin at the time of stopping the rotation and moving the injection screw forward to inject and fill the metered molten resin within the front portion of the heating cylinder to a mold through the nozzle.

In this closing of the ring valve, the ring valve moves with the injection screw to a position where the metered resin is sufficiently compressed by the top end surface of the screw to generate the resin pressure contributive to the valve closing. This moving stroke tends to be longer as the viscosity of the resin is lower. Therefore, the ring valve is not closed simultaneously with the forward movement of the screw, while part of the metered resin flows back within the valve ring and leaks to the screw groove until the flowing gap between the valve rear end surface and the sheet ring is closed by the resin pressure, and this leaked portion possibly affects the product weight as dispersion of metering.

As means for preventing this leak of the metered resin, it has been adapted to reversely rotate the injection screw (right-hand rotation) to reduce the resin pressure within the screw groove on the feed part side lower than the resin pressure on the metering side, move the ring valve backward to the sheet ring by this differential pressure to close it, and then move the screw forward to perform injection filling. The reverse rotation of the screw is carried out simultaneously with the start of injection or in a suck back position after the end of metering (refer to Japanese Laid-Open Patent Publication No. 62-60621 and Japanese Patent No. 2814212).

Since the above-mentioned closing of the valve by the above-mentioned reverse rotation of the screw depends on a decompression caused by the back feed of the molten resin in the screw groove by the reverse rotation, the metered resin also flows back to the feed part side until the ring valve is moved backward and closed. Accordingly, the effect remains at a reduction in metering dispersion. Further, there is a problem that since the leak quantity by backflow tends to increase as the viscosity of the resin decreases, such means are hardly adaptable to injection molding of low-viscosity resin.

SUMMARY OF THE INVENTION

The present invention thus has an object to provide a new method for preventing backflow of resin in an injection apparatus, which hardly causes metering dispersion even in use of low-viscosity resin as material resin by preventing the leak of the metered resin by backflow in injection filling not depending on the reverse rotation of the screw prior to injection filling, but by closing the ring valve by controlling the screw forward movement speed in injection filling.

According to the present invention, in an injection apparatus comprising an injection screw with a backflow preventive ring valve at a screw tip part provided within a heating cylinder so as to be rotatable and movable forward and backward, and adapted to inject and fill a metered molten resin in a front portion of the heating cylinder to a mold by forward movement of the screw, an injection filling speed and a valve closing operation speed are set to the screw forward movement speed, the valve closing operation speed being different from an initial speed of the injection filling speed, and the valve closing operation time is set to the time necessary for moving the injection screw by a distance capable of performing the valve closing after the end of metering, and after the ring valve is closed with the set valve closing operation speed and the set valve closing operation time, the screw forward movement speed is controlled to the injection filling speed to perform injection filling of the metered resin.

The valve closing operation speed is set higher than the initial speed of the injection filling speed or 30 millimeters/second(mm/s) or more, and the operation time is set to the range of 10 to 50 milliseconds(ms).

Since the ring valve which is laid in a stationary state is closed at a speed different from the initial speed of the injection filling speed prior to starting of injection filling of the metered resin, the valve closing can be hastened more than in conventional means. Since the forward movement is limited to the distance and time capable of performing the valve closing, the metered resin is never excessively compressed, and even if a backflow occurs up to the valve closing, the leak thereby is too small to affect the weight of a molding. Accordingly, the metering dispersion by the leak up to the valve closing can be eliminated. When the valve closing operation speed is set higher than the initial speed of the injection filling speed, particularly, the valve closing efficiency in low-viscosity material resin can be improved.

Further, since the injection filling of the metered resin is performed after closing the ring valve, the backflow of the metered resin after starting the injection filling is also eliminated, and the metering dispersion by the leak from the ring valve can be solved in combination with the leak prevention up to the valve closing before injection filling. Since the process can be transferred from the valve closing to the injection filling process by controlling the forward movement speed of the injection screw, the same injection molding operation as in the past can be executed.

DESCRIPTION OF THE PREFERRED EMBODIMENT

Figure 1:
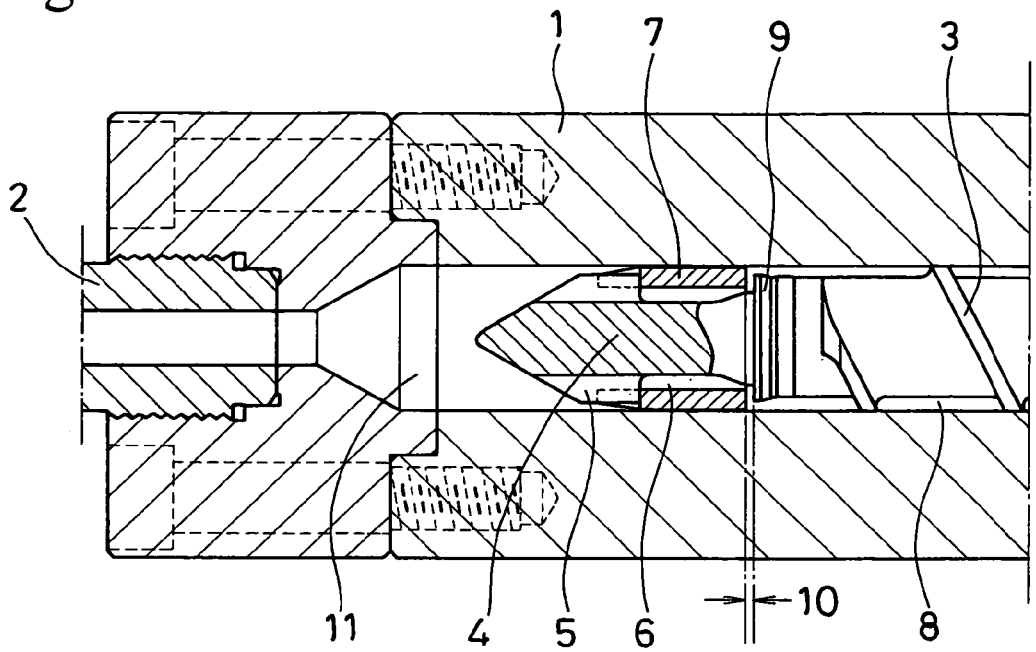
FIG. 1 is a vertical sectional side view of a heating cylinder tip portion of an injection apparatus capable of executing a method for preventing backflow of metered resin according to the present invention, which shows a valve opened state after the end of metering.
Figure 2:
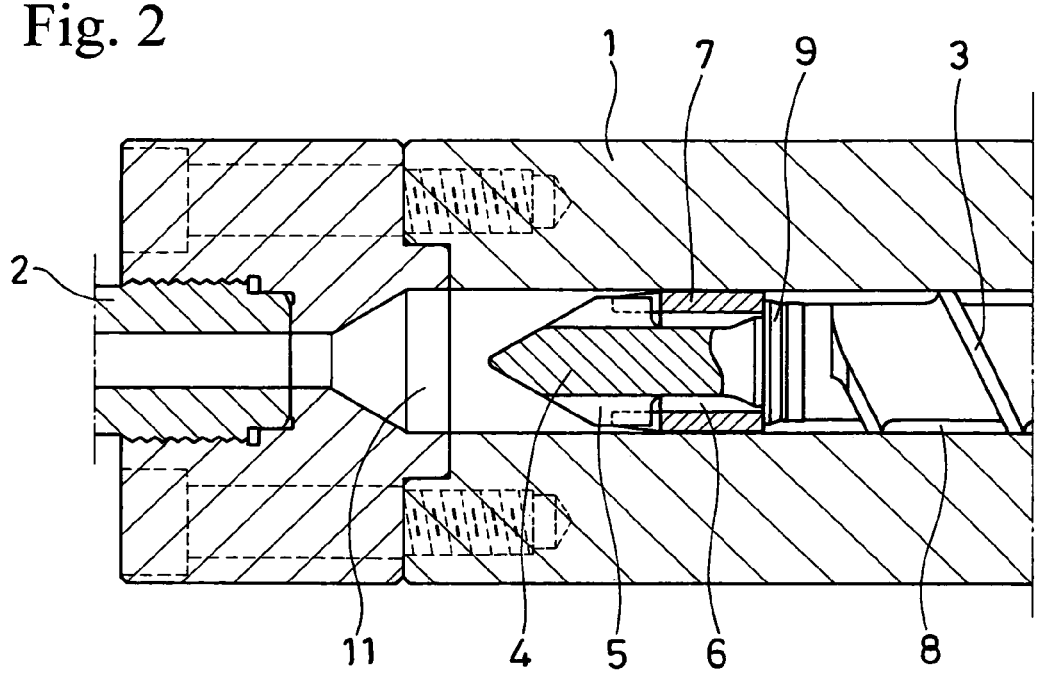
FIG. 2 is a vertical sectional side view of the heating cylinder tip portion of the same injection apparatus, which shows a valve closed state at the time of starting injection filling.

FIGS. 1 and 2 show a tip part of a general in-line screw type injection apparatus intended by the present invention, in which FIG. 1 shows a valve opened state after the end of metering, and FIG. 2 shows a valve closed state at the time of starting injection filling.

In the drawings, denoted by numeral 1 is a heating cylinder having a nozzle 2 at a tip, and 3 is an injection screw provided within the heating cylinder 1 so as to be rotatable and movable forward and backward. The injection screw 3 comprises a screw tip portion 4 having a conical top end surface, with a plurality of distribution grooves 5 being axially provided on the side surface thereof, and an annular groove 6 formed around a shaft part adjacent to the top end surface.

A cylindrical ring valve 7 to be fitted with the inner-circumferential surface of the heating cylinder 1 with a sliding clearance is inserted around the annular groove 6 so as to be movable forward and backward, wherein molten resin not shown in a screw groove 8 flows into the annular groove 6 on the inside of the ring valve 7 through a flowing gap 10 (e.g., 0.5-3.0 mm) between the ring rear end surface of the ring valve 7 and a sheet ring 9 around the screw shaft at the rear end of the annular groove 6, runs in the screw tip direction, and is metered (accumulated) within a front portion 11 of the heating cylinder 1 by backward rotational movement of the injection screw 3.

The ring valve 7 is moved until its front end surface is caught by the front edge of the annular groove 6, receiving the pressure of the molten resin moving in the screw groove 8 on the feed part side by the rear end surface of the ring valve, thereby forming the flowing gap 10, and laid in the opened state shown in FIG. 1. The molten resin in the screw groove 8 flows into the annular groove 6 through the flowing gap 10, and is further force-fed into the front portion 11 of the heating chamber 1 through the distribution groove 5 on the screw top end surface, to be accumulated therein. The injection screw 3 is moved backward to a preset retreat limit position by the pressure of the accumulated resin while increasing the accumulation quantity. When the screw rotation is stopped in the retreat limit position, the injection screw 3 is stopped in that position with stoppage of movement of the molten resin, and the metering is ended.

When the injection screw 3 is moved forward at the valve closing operation speed in the valve opened state after the end of metering shown in FIG. 1, the ring valve 7 which is laid in a stationary state by the stoppage of the screw is difficult to instantaneously move synchronously with the screw tip part, because it is closely fitted to the inner-circumferential surface of the heating cylinder 1 by the molten resin interposed in the sliding clearance with the inner-circumferential surface, and the movement of the ring valve is slightly delayed to narrow the flowing gap 10 with the sheet ring 9. Further, since the ring valve 7 is moved backward, receiving the resin pressure of the metered resin which is generated according to the forward movement of the screw, the valve closing is hastened by the synergistic effect thereof, compared with the case with only the resin pressure by moving the injection screw 3 forward at the injection filling speed. Therefore, the leak of the resin by backflow up to the valve closing can be almost eliminated.

In the pressure on the metered resin by the forward movement of the screw tip portion, excessive pressure on the metered resin is suppressed by setting the operation time at the valve closing operation speed to the time necessary for moving the injection screw 3 by a distance capable of performing the valve closing after the end of metering (10-50 ms) to control the forward movement of the screw to a necessary minimum. Therefore, from the point of the difference between the injection stroke and the forward movement stroke, the pressure never reaches such a pressure as it activates the leak by backflow of the resin up to the valve closing, and even if the resin is leaked from the nozzle, the leak is limited to only part of the resin quantity for molding a part such as a spool or runner without affecting the molding thereof.

When injection molding of low-viscosity resin, for example, polycarbonate (disk grade), polystyrene high flow, low-viscosity polyethylene, liquid crystal polymer, polyamide, modified polyamide or the like is performed by adopting such a valve closing means, the valve closing operation speed is preferably set higher than the initial speed of the injection filling speed. When the valve closing is performed by pressing the low-viscosity resin at the injection filling speed, the resin pressure resulted from the pressing is low because of the lower viscosity of the resin, and much time is required for the valve closing involved by the screw forward movement. Therefore, the leak of the resin during it is increased, and the metering dispersion is also increased. According to the valve closing by the high-speed forward movement of the injection screw independent from the resin pressure, however, the valve closing is performed regardless of the magnitude of the resin pressure caused by the forward movement of the screw. Therefore, even if the material resin has a low viscosity, the valve closing for every molding can be surely performed.

The injection filling of the metered resin to a mold not shown can be performed by controlling the forward movement speed of the injection screw 3 to the injection filling speed after the lapse of the valve closing operation time. This can be attained only by changing the valve closing operation speed to the initial speed of the injection filling speed without requiring any special control means. Accordingly, the valve closing and the injection filling can be continuously executed only by controlling the speed of the injection screw 3.

Example

| | | | | |
|---|---|---|---|---|
| Material resin: | Polycarbonate AD 55003 manufactured by TEIJIN LTD. | | | |
| Viscosity (Pa · s): | 47 | | | |
| Molding: Information recording disk, | | | | |
| Design weight (g): | 15.5 | | | |
| Injection molding machine: | CD400E (manufactured by NISSEI PLASTIC INDUSTRIAL CO.) | | | |
| Injection stroke (mm): | 30 | | | |
| Flowing gap (mm): | 1.0 | | | |
| Valve closing operation speed (mm/s): | 30 | 50 | 70 | |
| Operation time (ms): | 10 | 10 | 10 | |
| [No. 1] Injection filling speed (mm/s) | | | | |
| V1 (initial speed) | V2 | V3 | V4 | |
| 10 | 20 | 100 | 30 | |
| [No. 2] Injection filling speed (mm/s) | | | | |
| V1 (initial speed) | V2 | V3 | V4 | |
| 40 | 40 | 40 | 40 | |

In Example No. 1, since the initial speed V1 of the injection filling speed is set to 10 mm/s, the valve closing operation speed to be set thereto is higher than the initial speed V1. In Example No. 2, since the initial speed V1 of the injection filling speed is set to 40 mm/s higher than that in No. 1, the valve closing operation speed 30 mm/s is to be set lower than the initial speed V1.

Figure 3:
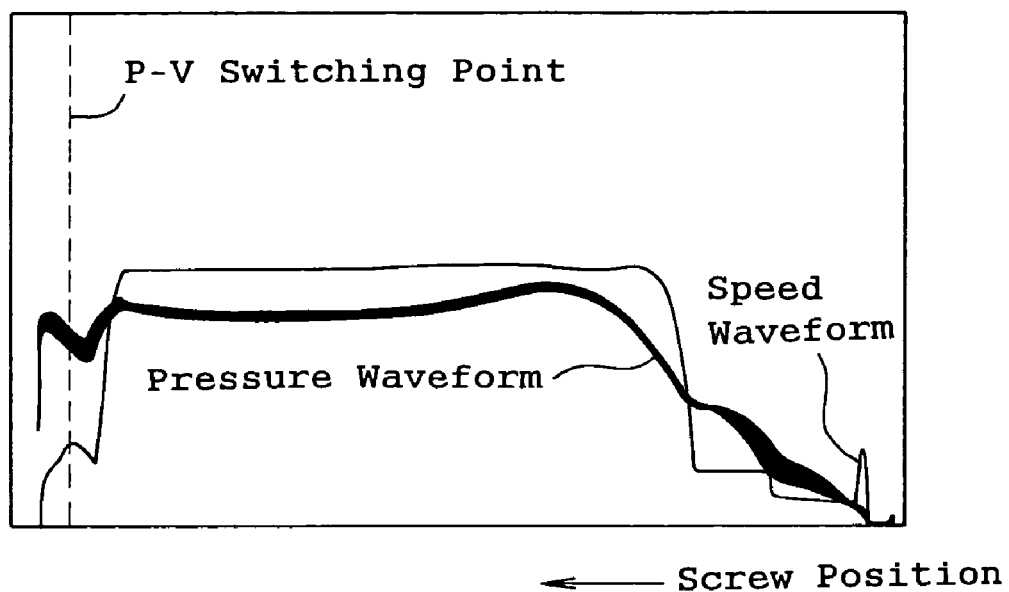
FIG. 3 is a monitoring chart of speed waveform and pressure waveform with a valve closing operation speed of 30 mm/s and an operation time of 10 ms according to the present invention.
Figure 4:
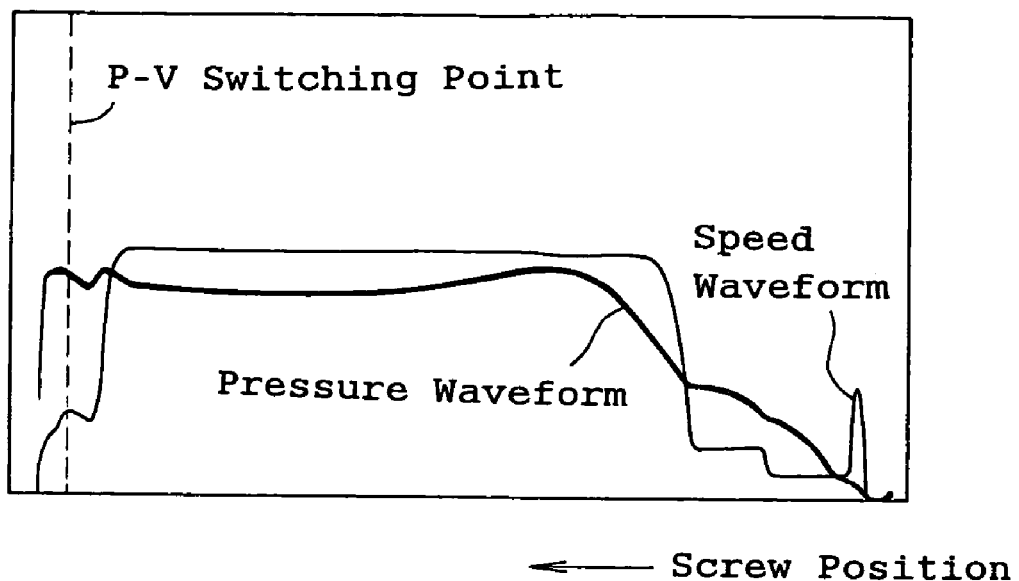
FIG. 4 is a monitoring chart of speed waveform and pressure waveform with a valve closing operation speed of 50 nm/s and an operation time of 10 ms according to the present invention.
Figure 5:
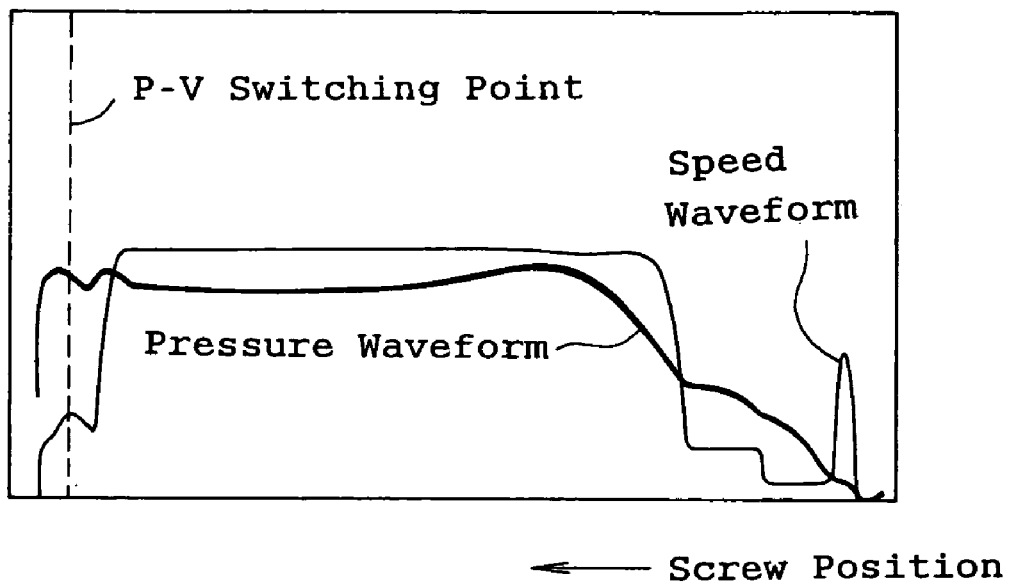
FIG. 5 is a monitoring chart of speed waveform and pressure waveform with a valve closing operation speed of 70 mm/s and an operation time of 10 ms according to the present invention.

FIGS. 3 to 5 are monitoring charts of speed waveform and pressure waveform in valve closing operations with the above-mentioned valve closing operation speeds (30, 50, 70 mm/s) and the operation time (10 ms) for the injection filling speed of Example No. 1, respectively.

Figure 6:
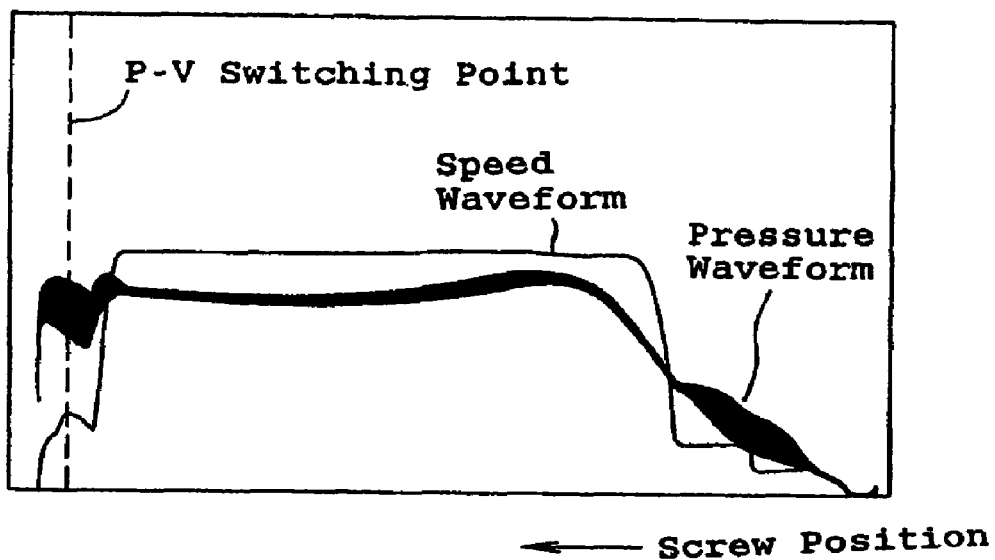
FIG. 6 is a monitoring chart of speed waveform and pressure waveform with a valve closing operation speed of 0 mm/s and an operation time of 0 ms in conventional means.

FIG. 6 is a monitoring chart of speed waveform and pressure waveform in a conventional means wherein the valve closing is performed at the injection filling speed with a valve closing operation speed (0 mm/s) and an operation time (0 ms) as a comparative example. In each of the monitoring charts, the waveforms for 50 shots are overwritten, and the deviation of pressure waveform in startup shows the fluctuation width of pressure of the metered resin. Accordingly, larger fluctuation width shows larger metering dispersion.

Table 1 concretely shows the monitored metering dispersions based on the weight metering results for x pieces of moldings. In the table, the column with set speed: 0 mm/s and operation time: 0 ms shows the result of the conventional means of performing the valve closing at the injection filling speed.

TABLE 1

| | Set speed of valve closing operation | | | |
|---|---|---|---|---|
| | 0 mm/s | 30 mm/s | 50 mm/s | 70 mm/s |
| Valve closing operation time | 0 ms | 10 ms | 10 ms | 10 ms |
| Weight metering result [g] | | | | |
| Maximum | 15.47 | 15.55 | 15.55 | 15.56 |
| Minimum | 14.36 | 14.60 | 15.47 | 15.50 |
| Difference | 1.11 | 0.95 | 0.08 | 0.06 |
| Weight mean value | 15.14 | 15.27 | 15.52 | 15.54 |

As is apparent from the monitoring charts of FIGS. 3 to 6 and Table 1, when the valve closing is performed by forward movement of the injection screw while setting the valve closing operation speed to the screw forward movement speed, the metering dispersion is minimized even in use of low-viscosity resin as the material resin, and the molding weight is also stabilized. The higher the speed is, the higher the closing efficiency (weight mean value) is. The closing efficiency at 30 mm/s is lower than that at 50 mm/s but higher than that in the conventional means, and the closing efficiency depends on the viscosity of the material resin. Accordingly, the valve closing operation speed is set at least 30 mm/s or more for the initial speed of the injection filling speed, whereby the leak of the metered resin from the ring valve can be reduced more than in the conventional means.

What is claimed is:

1. A method for preventing backflow of resin in an injection apparatus, the injection apparatus comprising an injection screw with a backflow-preventive ring valve at a screw tip part, provided within a heating cylinder so as to be rotatable and movable forward at a variable speed and backward, and adapted to inject and fill a metered molten resin within a front portion of the heating cylinder into a mold by forward movement of the screw, the method comprising:
    setting an injection filling speed and a valve closing operation speed to a valve-open screw forward movement speed, the valve closing operation speed being different from an initial speed of the injection filling speed;
    setting a valve closing operation time to a time necessary for moving the injection screw by a distance capable of performing the valve closing operation after an end of metering the molten resin;
    closing the ring valve using the set valve closing operation speed within the set valve closing operation time; and
    controlling a valve-closed screw forward movement speed to the injection filling speed to perform injection filling of the metered resin,
    wherein the valve closing operation speed is set higher than the initial speed of the injection filling speed.

2. The method for preventing backflow of resin in an injection apparatus according to claim 1, wherein the valve closing operation speed is set to 30 millimeters/second or more, and the operation time is set to the range of 10 to 50 milliseconds.

* * * * *

UNITED STATES PATENT AND TRADEMARK OFFICE
CERTIFICATE OF CORRECTION

PATENT NO. : 7,578,952 B2
APPLICATION NO. : 11/241861
DATED : August 25, 2009
INVENTOR(S) : Shiozawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Fourteenth Day of September, 2010

David J. Kappos
*Director of the United States Patent and Trademark Office*